April 23, 1940.  A. L. BOEGEHOLD  2,198,240
BEARING
Filed Oct. 13, 1937   2 Sheets-Sheet 1

Inventor
Alfred L. Boegehold
By Blackmore, Spencer & Flint
Attorneys

April 23, 1940.  A. L. BOEGEHOLD  2,198,240
BEARING
Filed Oct. 13, 1937   2 Sheets-Sheet 2

Inventor
Alfred L. Boegehold
By Blackmore, Spencer & Hiss
Attorneys

Patented Apr. 23, 1940

2,198,240

UNITED STATES PATENT OFFICE 2,198,240

BEARING

Alfred L. Boegehold, Detroit, Mich., assignor to General Motors Corporation, Detroit, Mich., a corporation of Delaware Application October 13, 1937, Serial No. 169,411

12 Claims. (Cl. 308—237)

This invention has to do with plain bearings such as are used for main bearings and connecting rod bearings of internal combustion engines and for similar purposes. Such bearings usually consist of a relatively hard metal back lined with soft bearing metal. To operate satisfactorily in modern automobile engines the bearing surface must have good frictional properties; must be resistant to scoring; must be resistant to acids ordinarily present in the crankcase of the engine such as sulphurous acid formed from combustion products seeping past the piston rings, and oleic and other organic acids formed by oxidation of lubricating oil during engine operation or included in the composition of certain kinds of oil; and must be resistant to fatigue under heavy loads and other severe operating conditions encountered in engine operation.

All of the above requirements have been met by the bearings hereinafter described. In addition the materials employed are sufficiently cheap and the methods of manufacture are sufficiently simple so that the cost of the bearings in large production should be little, if any, greater than that of ordinary bearings.

The improved bearing consists of a strong metal back, preferably made of sheet steel, to which is secured in intimate, heat conducting relation as by a good bond, a rigid metallic sponge, the sponge having a coarse, lattice-like structure, the interstices of which are filled with soft bearing metal which also forms a thin covering layer or skin overlying the major portion or the whole of the sponge. It has been found to be important that the metal sponge shall have the described structure so as to insure that the soft bearing metal shall enter the numerous cavities in the lattice and be securely bound and bonded to it, and also to insure that the compression load is taken at numerous points either by exposed portions of the sponge or by portions covered by a thin skin or film of the soft bearing metal.

For best results it appears that the bearing metal should terminate substantially at the most upwardly projecting points on the metallic sponge so that the sponge shall be exposed only at isolated spots on the bearing surface. Elsewhere the thickness of the soft bearing metal will vary from an infinitesimal amount to some thousandths of an inch at places where it has relatively deep roots in the pores of the sponge. It is estimated that, in bearings designed for high speed and heavy loads, the amount of exposed sponge will not exceed about 10% of the bearing area and, in the case of some of the bearings, little, if any, of the sponge will be exposed. Where operating loads are higher and rubbing speeds are such that the highest degree of resistance to scoring is not required, the bearing may be machined so as to expose more of the foundation sponge. Thus, depending upon the requirements of the service in which the bearing is to be used, and the metals employed for the sponge and for the overlay, the proportions of soft bearing metal and of rigid sponge structure appearing on the surface of the bearing may be considerably varied, and, in the case of the preferred copper-nickel alloy sponge and the preferred lead-tin-antimony bearing alloy, this variation may run from 100% soft bearing metal and no exposed sponge to over 50% exposed sponge and corresponding less exposed soft bearing metal.

With this construction the exposed soft bearing metal is so well supported by the underlying structure that it has proven possible to employ softer bearing alloys than have heretofore been considered practical, such as the new alloy of lead, tin and antimony herein described which has extraordinarily good resistance to corrosion in addition to the other properties required. Furthermore, the construction of the improved bearings makes possible better combinations of materials in respect to strength, antiscoring properties and resistance to corrosion than can be obtained by the usual casting methods. Thus the extensively used copper-lead bearings produced by the casting process have the limitation that the lead phase is more or less pure and is therefore attacked by acids occurring in crankcase lubricants. Any attempt to alloy the lead in such bearings with metals, such as tin or antimony, to render it corrosion-resistant, results at the same time in alloying of the copper phase with the added ingredients, rendering it of such poor frictional properties that it is not successful as a bearing.

The bearings here disclosed also possess a structure consisting of an arrangement of strong phase and soft phase which is unobtainable by casting. The strong phase is continuous below the bearing surface to afford the proper degree of strength to resist pounding but at the bearing surface the soft lead alloy phase is continuous or substantially so in order to provide the proper anti-frictional properties. If a copper-lead bearing made by melting and casting the copper-lead is treated so that the lead phase is continuous at the bearing surface, providing good frictional properties, it will be continuous all through the copper-lead layer down to the steel back and will lack strength to resist fatigue. If, instead, such bearings are processed so that the copper is the continuous phase and the lead occurs only in spots in order to provide the desired resistance to pounding, then the anti-frictional properties will be bad and the bearing will fail by scoring. The improved bearing here disclosed provides the advantages of both of the last named constructions without their disadvantages.

While there is considerable room for choice in the selection of the other materials going into the finished bearing, low carbon steel strip is preferred for the bearing back because of its strength, workability, high melting point and low cost. It is best to copper-plate the steel strip before applying the sponge so as to insure a good bond although this is not absolutely essential.

Best results have been secured by employing a copper-nickel alloy sponge preferably consisting of approximately equal proportions of copper and nickel powders, thoroughly mixed and loosely applied to the bearing back and sintered to it. The soft bearing metal is preferably applied by vacuum impregnation but may be applied either by passing the strip through a bath of the metal or by applying the metal to the back and melting it so that it soaks into the pores of the sponge.

The rough strip is then machined to the required thickness, preferably down to the tops of the highest projections on the sponge, and is subsequently cut into blanks and the blanks are pressed into shape, and machined to finished bearing form by the usual methods.

The finished bearings possess all of the properties required for long service under severe operating conditions and in actual tests have proven themselves superior in durability to any heretofore known. The soft bearing metal surface gives the bearing unusually good frictional properties as well as exceptional resistance to scoring and to acids. The metal sponge in combination with the thin skin of soft bearing metal gives the necessary resistance to compression fatigue and makes the bearing capable of withstanding exceptionally long periods of service under the heavy loads encountered in modern high speed, high compression internal combustion engines. The copper-nickel alloy sponge is itself a fairly good bearing metal although somewhat inferior in anti-scoring properties but as it forms but a part of the bearing surface, no trouble is experienced and usually some advantage is secured from its occurrence at the surface. The frictional properties of the exposed sponge appear to be improved by the film of lead that is gradually wiped over it in service.

The details of the invention are disclosed in the following description taken in connection with the accompanying drawings in which.

Figure 1:
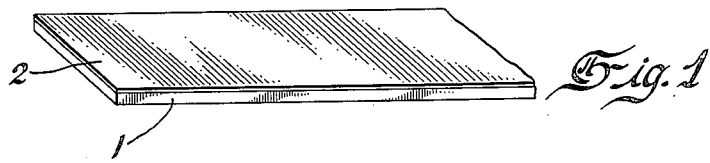
Figure 1 is a perspective view of the plated strip.

Referring to Figures 1 to 4, I indicates a portion of a strip of steel, preferably hot or cold rolled low carbon stock. In one specific application of the invention strip .051" thick was used.

The strip is illustrated as provided on one side with a coating 2 of copper. This may be conveniently done by electroplating. In some cases it may be desirable to copper plate both sides of the strip and this may be done by simply passing the strip through a suitable copper plating bath. The thickness of the copper plating as well as the other applied layers is exaggerated in the drawings.

Figure 2:
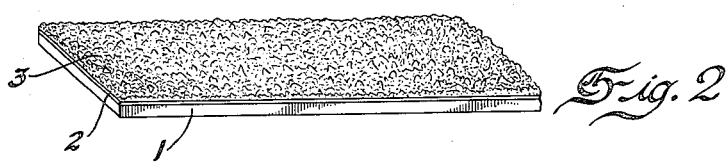
Figure 2 is a view of the strip after application of the metal sponge.

In Figure 2 there is shown bonded to the copper-plated strip a metallic sponge 3. Care must be taken in the preparation of the sponge in order to obtain the desired coarse, lattice-like structure securely bonded to the back in a layer of substantially uniform thickness. The preferred method of manufacture consists in applying a uniform layer of powdered metal of the desired composition to the strip and then sintering the powder together and bonding it to the back by passing the strip through a furnace containing a reducing atmosphere. Inasmuch as there is considerable shrinkage on sintering, the thickness of the layer of powder and the time and temperature of sintering must be so chosen as to produce a metal sponge of the desired final thickness. Good results have been obtained with a sponge of about .020" thickness after sintering.

It has been found that the size of the metal powders employed is an important factor in determining the sponge structure, and, in general, it is necessary to employ coarse powder for the major constituent of the sponge. Grain sizes employed will vary somewhat with the specific materials used for the sponge. Thus in the case of the preferred copper-nickel sponge consisting of 55 parts powdered copper and 45 parts powdered nickel, excellent results have been obtained with nickel powder which passes an 80 mesh screen and is held on a 100 mesh screen, thoroughly mixed with copper powder which passes a 100 mesh screen and is held on a 200 mesh screen. This particular composition has the advantage that at the preferred sintering temperature of 2150° F. the nickel is not melted and the nickel particles, although softened, retain their form while the copper is liquefied and enters into solution with them and increases their size so that the size of the pores is increased by the sintering. The strip is maintained at the above temperature for about fifteen minutes to accomplish complete alloying between the copper and the nickel as well as the sintering of the particles together and to the bearing back.

In the case of the preferred form of copper-nickel sponge good results have been obtained with a coarse, lattice-like structure in which the cavities measure from about .005 to .010" across.

If desired, pore-forming materials such as salicylic acid may be mixed with the powdered metal, such materials volatilizing during the sintering operation and leaving pores in the adhered layer.

The strip with the powder on it may, if desired, be put through rolls to increase the density of the powdered layer. Or after sintering the strip may be rolled to produce a more uniform surface but best results have been obtained without rolling either before or after sintering for this reduces the porosity of the sponge.

The best soft bearing metal so far developed for application to the copper-nickel sponge is an alloy consisting of approximately 94 parts lead, 3 parts tin and 3 parts antimony. This alloy is very soft so that particles of grit working into the bearing may readily be embedded in it. The alloy is also very ductile; possesses good frictional and anti-scoring properties and is very resistant to all of the acids found in the crankcases of internal combustion engines. It is also inexpensive because it contains but small amounts of the more expensive metals, tin and antimony. Obviously, the proportions of the metals may be varied somewhat. Thus the proportions of tin and antimony may each range from 2 to 4%, with the balance lead, without materially affecting the properties of the bearing or greatly increasing its cost. In general, alloys falling within the range of 85 to 98 parts of lead, 2 to 15 parts tin and/or 2 to 15 parts antimony will be found to possess good corrosion resistance and to be adapted for use as bearing materials when supported by a very closely underlying metal sponge or other support as disclosed herein. The use of the larger amounts of tin and antimony is less desirable as it will be accompanied by increased tendency to alloy with the copper-nickel sponge on impregnation, resulting in somewhat impairing the score-resisting properties of the sponge. In some cases either the tin or the antimony may be omitted but usually it will be found best to use some of each since each metal appears to have an inhibiting effect on the action of certain acids. Antimony and tin increase the hardness and strength of the lead alloy.

While the soft bearing metal may be applied to the metal sponge covered strip by simply placing the soft metal on the spongy surface and heating it to cause the soft metal to melt and flow into the pores of the strip or by treating the strip with a suitable flux and immersing it in the molten soft metal, it is preferable to employ vacuum impregnation now to be described. The lead-tin-antimony alloy is melted and maintained at a suitable temperature preferably about 650° F. in a tank to which vacuum may be applied above the surface of the molten metal. Within the tank the sponge covered strip which has previously been treated with suitable flux, such as zinc chloride, is suspended and the tank is evacuated. When suitable vacuum is attained, for example sufficient to evacuate the greater portion of the air from the pores of the material, the strip is immersed below the surface of the alloy and is held there until bubbling ceases. The vacuum is then released and heavy air pressure, for example, seventy pounds per square inch, is applied. This has the effect of injecting the alloy into the pores of the sponge and insures thorough penetration.

The impregnated strip is then removed and cooled by air blast or by projecting water on the under or backing side of the strip so as to prevent any substantial alloying of the filler with the metal of the sponge, and also prevent trapping of the flux between the soft metal layer and the sponge, for since the soft metal solidifies from the bottom upwardly it pushes the flux ahead of it toward the outer surface of the bearing. The quick chilling of the under surface of the strip not only tends to eliminate the flux from the sponge but also tends to close any empty pores that would otherwise remain in it.

The impregnated strip is then machined to final thickness and in doing so only enough soft metal is removed from the bearing surface to leave a skin of soft metal over all or a major portion of it.

Figure 3:
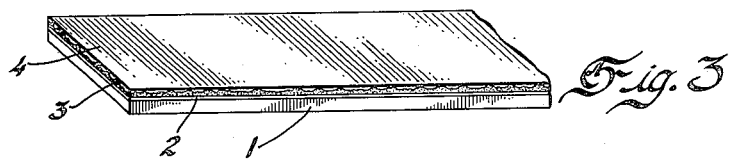
Figure 3 is a view of the strip after application of the soft bearing metal and the machining of same.

In Figure 3 the skin of soft metal 4 is shown extending over the entire bearing surface. This skin should not extend more than about .001" above the peaks of the sponge for if the overlying portion is substantially higher, for example as much as .003" when measured at the tops of the peaks, it is likely to crack and break off as a result of compression fatigue under heavy load.

Figure 4:
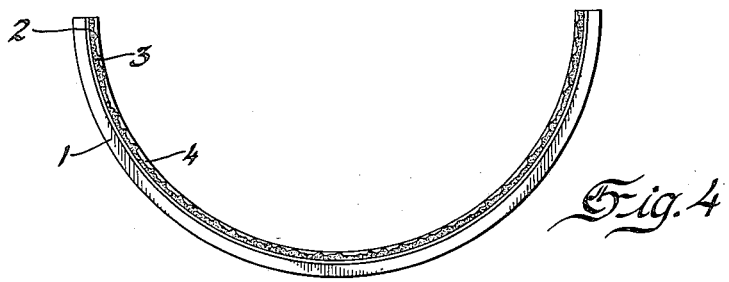
Figure 4 is an end elevation of a bearing formed from the strip of Figure 3.
Figure 5:
Figure 5 is a photomicrograph of a section through my improved bearing with a magnification of 50 diameters.

It will be noted that as shown in Figures 3 and 4 the skin 4 is supported in many places by the closely underlying metal sponge in which it is anchored by many roots. This feature of the construction is best shown in Figure 5 which is a photomicrograph of a section through my improved bearing magnified 50 times. Here 1' indicates a portion of the steel back, 3' the copper-nickel sponge and 4' the soft bearing metal.

Figure 6:
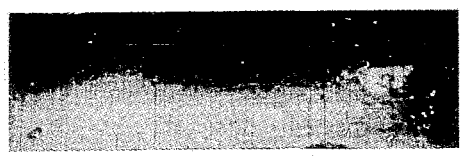
Figure 6 is a photomicrograph taken with a magnification of 3 diameters showing the surface of my improved bearing when machined down to the line indicated at 6—6 on Figure 5.
Figure 7:
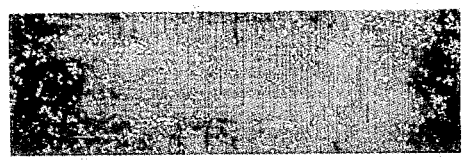
Figures 7, 8 and 9 are views similar to Figure 6 showing the bearing surface when machined down to the lines indicated at 7—7, 8—8, and 9—9 of Figure 5.
Figure 8:
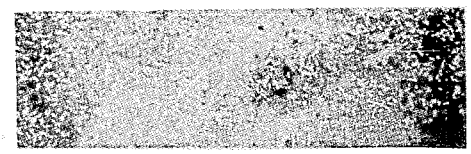
Figure 9:
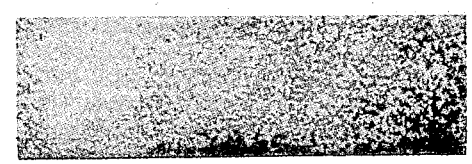

When the bearing face is machined down to the line 6—6 of Figure 5 and formed to the shape of a half bearing the bearing surface has the appearance shown in Figure 6. Figure 7 indicates the appearance of the bearing surface when machined down to the line 7—7 which is about .005" below the line 6—6, while Figures 8 and 9 show the bearing surface when machined to lines 8—8 and 9—9, respectively. These figures are photomicrographs of bearing surfaces produced in the manner described. In preparing the bearings for the making of the photomicrographs, Figures 6 to 9, the bearing surfaces were slightly etched with dilute acid, such as dilute nitric acid, to darken the lead alloy and produce better contrast between it and the exposed portions of the sponge. The large variations in shade on the photomicrographs result from unevenness of the etching. The significant thing shown by the photomicrographs is the large number of very small light colored areas which are the exposed portions of the sponge.

For high-speed heavy-duty work it is preferable to machine the bearings to approximately the extent shown in Figures 6 and 7 with the skin of soft metal overlying all but about 10% of the sponge. Where the speed is high but the load is lighter the form shown in Figure 3 with the skin extending over the entire bearing area will be found satisfactory. Where the loads are heavy but the speed is not so high and consequently the maximum bearing temperature is lower, good results will be obtained from bearings machined to the extent shown in Figures 8 or 9. It is estimated that in Figure 9 on the order of 50% of the sponge is exposed. The copper-nickel sponge is a fairly good bearing metal possessing fair anti-scoring properties but is rather hard so that abrasive particles cannot become embedded in it. The sponge gives strength to the bearing surface enabling it to carry heavy loads.

The finished strip is cut into blanks of the proper size for a half bearing, bent into semi-circular shape, trimmed and broached and provided with the necessary oil holes and grooves. Figure 4 illustrates the finished bearing made from the strip of Figure 3. Successful bearings have been made having finished overall thickness of from .053" to .070" of which the impregnated metal sponge constituted about .020". It is not believed that these dimensions are critical.

Finished bearings made according to the preferred form of this invention have proven to have a useful life several times as long as the best commercial bearings now available when operated under the most severe operating conditions obtaining in high compression automobile engines of present day design.

Obviously, the invention is susceptible of considerable modification. Thus the back could be made of other metals such as nickel or alloys of nickel having sufficiently high melting points. However, the greater cost of such materials makes their use uneconomical.

Copper plating may be dispensed with if desired, as shown in Figure 7, the only essential being that the sponge be securely bonded to the backing strip.

The proportions of nickel and copper employed in the preferred composition of sponge may be varied considerably. The nickel content may be increased although any large increase may be somewhat objectionable because it raises the sintering temperature, tends to impair the frictional properties, and affects the degree and kind of porosity. Increasing the copper content may prove desirable for pure copper itself is a fairly good bearing material, but in any case suitable porosity must be maintained.

For some uses a sponge of satisfactory porosity made of bronze, (i. e., copper-tin alloy) will be satisfactory although experience indicates that it has inferior anti-scoring properties, as compared with the preferred copper-nickel alloy. Bronze can be readily bonded to the steel back. For best results the bronze should consist of from 1 to 12% tin and the balance copper.

It will be understood that the preceding objections to modified structures are made with the most severe kind of high-speed heavy-duty service in mind. Such modified forms of bearings will give very good service where the loads are lighter or the speeds slower.

I claim:

1. A bearing comprising a sintered porous sponge of metal having good bearing characteristics, said sponge forming a strong load supporting framework and being impregnated with and having an overlying skin of a corrosion-resistant lead base babbitt containing approximately from 2 to 15% antimony, and from 2 to 15% tin and the balance lead.

2. A bearing comprising a sintered metal sponge of copper-nickel alloy forming a strong load supporting framework impregnated with and having an overlying skin of a corrosion resistant lead base babbitt containing approximately from 2 to 15% antimony, from 2 to 15% tin and the balance lead.

3. A bearing comprising a sintered porous metal sponge forming a strong continuous load-supporting framework impregnated with and having a skin of soft bearing metal on its bearing surface, the skin being of such slight thickness at numerous points that upon the wearing away or piercing of the skin at such points the exposed portions of the sponge functions as the bearing surface without impairing the performance of the bearing.

4. A bearing comprising a sintered porous sponge of metal having good bearing characteristics, said sponge forming a strong load-supporting framework and being impregnated with and having a skin of corrosion resistant soft bearing metal on its bearing surface, the skin being of such slight thickness at numerous points that upon the wearing away or piercing of the skin at such points the exposed portions of the sponge function as the bearing surface without impairing the performance of the bearing.

5. A bearing comprising a solid metal back, a sintered porous sponge of metal having good bearing characteristics bonded to the back in intimate, good heat conducting relation, said sponge forming a strong load-supporting framework, said framework being impregnated with and having an overlying skin of soft bearing metal.

6. A bearing comprising a solid metal back, a sintered porous sponge of metal having good bearing characteristics bonded to the back in intimate, good heat conducting relation, said sponge forming a strong load supporting framework, said framework being impregnated with and having a skin of soft bearing metal forming on the order of 50% or more of the bearing surface.

7. A bearing comprising a steel back, a sintered porous sponge of copper-nickel alloy bonded to the back, said sponge being impregnated with and having an overlying skin of a corrosion-resistant soft bearing metal.

8. A bearing comprising a sheet steel back, a sintered porous sponge of copper-nickel alloy bonded to the back, and a skin of corrosion-resistant lead base babbitt forming a large proportion of the bearing surface and anchored by roots extending into the pores of the sponge.

9. A bearing comprising a sheet steel back, a sintered porous sponge of an alloy of approximately 55 parts copper and 45 parts nickel bonded to the back, and a skin of corrosive-resistant babbitt consisting of approximately 2 to 15 parts antimony, 2 to 15 parts tin and the balance lead forming a large proportion of the bearing surface and firmly anchored by roots extending into the pores of the sponge.

10. A bearing comprising a sintered matrix of relatively strong bearing metal having numerous cavities in the bearing surface, said cavities being filled with soft bearing metal, said soft bearing metal forming a skin over the bearing surface the skin being of such slight thickness at numerous points between said cavities that upon the wearing away or piercing of the skin at such points the exposed portions of the sponge function as the bearing surface without impairing the performance of the bearing.

11. A bearing comprising a solid metal back, a liner of relatively strong sintered bearing metal secured to the back in good heat conducting relation, said liner having numerous cavities in the bearing surface, said cavities being filled with soft bearing metal, said soft bearing metal forming a skin over the bearing surface, the skin being of such slight thickness at numerous points between said cavities that upon the wearing away or piercing of the skin at such points the exposed portions of the sponge function as the bearing surface without impairing the performance of the bearing.

12. A composite bearing element comprising a strong solid metal back, a sintered porous metal sponge bonded to the back in intimate, good heat conducting relation, said sponge forming a strong load-supporting framework, said framework being impregnated with and having an overlying skin of soft bearing metal.

ALFRED L. BOEGEHOLD.